Dec. 10, 1968  W. A. BISHMAN  3,415,395
POWERED TRUCK LOADING PLATFORM APPARATUS
Filed Dec. 20, 1967  5 Sheets-Sheet 1

INVENTOR.
WALTER A. BISHMAN
BY
Dugger Johnson & Westman
ATTORNEYS

United States Patent Office 3,415,395
Patented Dec. 10, 1968

3,415,395
POWERED TRUCK LOADING PLATFORM
APPARATUS
Walter A. Bishman, 10400 Bass Lake Road,
Minneapolis, Minn. 55428
Continuation-in-part of application Ser. No. 510,498,
Nov. 30, 1965. This application Dec. 20, 1967, Ser.
No. 692,075
28 Claims. (Cl. 214—75)

ABSTRACT OF THE DISCLOSURE

A truck box having a combined platform-tailgate movable between a horizontal condition to elevate or lower a load and a vertical condition to form a tailgate closure for the box. In both embodiments of the invention, the platform is pivotally supported by a pair of parallel shafts, each shaft being mounted on a crank arm and the crank arms are simultaneously rotated in the same angular direction the same angular amount to move the platform between ground level and the level of the floor of the truck. As to the first embodiment, through chain driven lobe shaped sprockets, the crank arms are moved, there being provided limit switches to stop the drive to the chain when the platform is at each one of said levels. As to the second embodiment, parallel control arms are connected to the crank arm shafts to move the crank arms in the above mentioned manner, limited axial movement of the screw terminating the rotary drive through the clutch to the screw when the platform is either at ground level or at the level of the floor of the truck.

Cross reference to related application

This application is a continuation-in-part application of application Ser. No. 510,498, filed Nov. 30, 1965, now abandoned.

Background of the invention

This invention relates to apparatus for moving a load between ground level and a level of the truck bed. More particularly, this invention relates to new and novel electrically powered loading platform apparatus for a truck that has substantially constant speed and power requirement for moving a load between ground level and the level of the truck bed or floor of the truck box. U.S. Patents 2,701,656 and 2,787,388 each disclose a pair of crank arms that are simultaneously rotated in opposite directions for moving a platform-tailgate assembly between ground level and truck bed level and a piston cylinder combination for rotating the crank arms. U.S. Patent 2,701,656 discloses intermeshing gears on the crank shafts to which the crank arms are connected.

Summary of the invention

A pair of crank arms are simultaneously rotated in the same direction about longitudinal axes for moving a truck platform-tailgate assembly between ground level and truck bed level. In one embodiment, chain drive lobe type sprockets are mounted on the crank arm shafts for rotating said shafts. In the other embodiment a ball nut assembly translated by the rotation of the screw on which it is mounted is connected through parallel control arms to the crank arm shafts for simultaneously rotating said shafts in the same direction. In the said other embodiment automatically operated clutch mechanism is preferably provided to interrupt drivingly rotating the screw when the platform is at either of the aforementioned levels. One of the objects of this invention is to provide new and novel electrically powered platform apparatus on a vehicle for moving a load between ground level and the level of the vehicle bed or floor. Another object of this invention is to provide electrically powered loading platform apparatus that maintains nearly constant torque between a fully lowered and a fully raised position. An additional object of this invention is to provide in loading platform apparatus for moving a load between ground level and the level of the truck bed or floor new and novel shaped sprockets. Still another object of this invention is to provide in platform elevating apparatus, a pair of transversely spaced crank arms that are simultaneously rotated in the same direction about a longitudinal axes for elevating and lowering a loading platform. A still further object of this invention is to provide automatically operated clutch assembly to release the driving force being applied through crank arm shafts for raising and lowering a tailgate-platform when the platform is at either bed level or ground level.

The invention will now be described with reference to the drawings in which the same reference numerals refer to corresponding parts and in which.

3

Figures 1, 2:
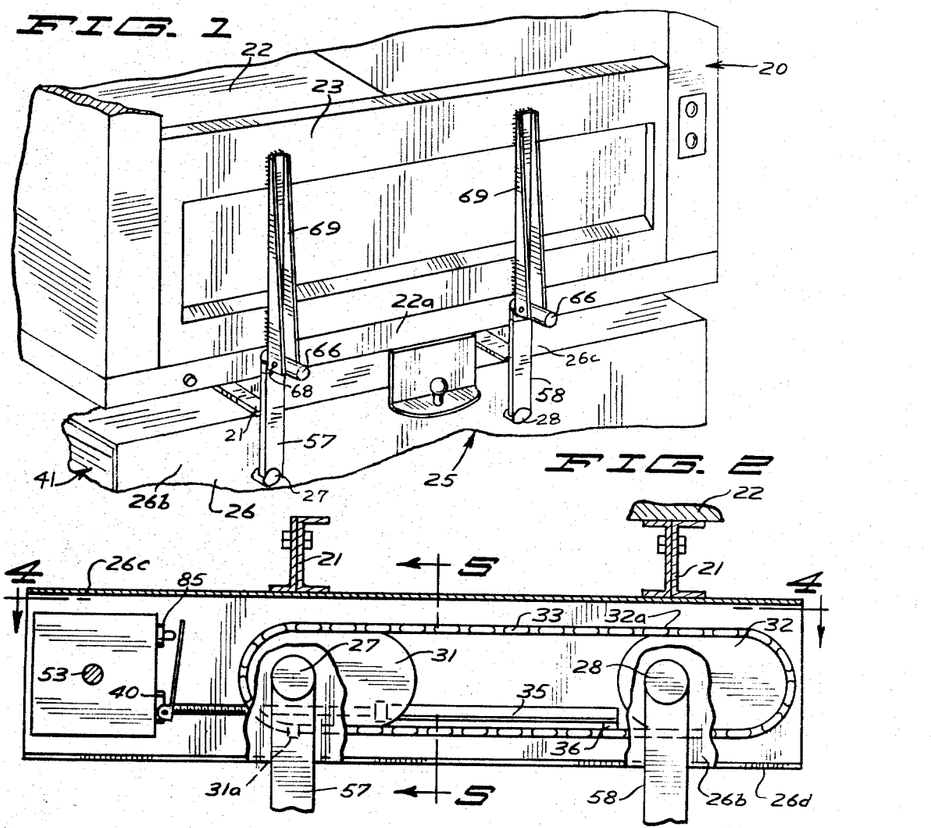
FIGURE 1 is a fragmentary perspective view of the rear end portion of a truck showing the first embodiment of combined tailgate and loading platform apparatus of this invention in an elevated, tailgate closed position.
FIGURE 2 is a fragmentary rear elevational view of the first embodiment of loading platform apparatus of this invention in a fully lowered position, most of the housing rear wall being broken away.

Referring now in particular to FIGURES 1 and 2, the first embodiment will now be described, there being illustrated the rear portion of a truck box, generally designated 20, that is mounted on a chassis frame 21 of a truck. The truck box includes a floor or bed 22, that is attached to the chassis frame and a combination tailgate-loading platform 23. The loading platform 23 constitutes a part of the loading platform apparatus, generally designated 25, of the first embodiment of the invention.

The apparatus 25 includes a housing 26 having a vertical, transversely extending front wall 26a, a rear wall 26b extending parallel to wall 26a, a top wall 26c having opposite transverse edges respectively joined to walls 26a and 26b, an opposite horizontal flange 26d having one edge joined to the lower edge of wall 26a and a horizontal flange 26e having one edge joined to the lower edge of rear wall 26b. Each of the flanges 26d, 26e have an opposite edge, said opposite edges being substantially horizontally spaced from one another. As may be noted from FIGURES 2 and 3, the top wall 26c is dependingly secured to the chassis frame 21 such that the rear wall 26b extends substantially parallel to the rear edge 22a of the truck floor or bed 22.

There are provided a pair of longitudinally extending transversely spaced crank shafts respectively designated 28 and 27 that are extended through the front and rear walls of the housing. Bearings 29 are mounted by the rear wall 26b for journalling the rear portions of the crank shafts for rotation, while bearings 30 are provided in wall 26a for journalling the front portions of the crank shafts. The hub portions of the lobe type sprockets 31, 32 are respectively keyed to crank shafts 27 and 28 such that the sprockets are located longitudinally intermediate the housing front and rear wall. Each of the sprockets 31, 32 are the same size and shape and have a smooth outer peripheral edge, except as noted in the next sentence. The sprocket 31 has a single sprocket tooth 31a that in the FIGURE 2 position is vertically beneath shaft 27 while sprocket 32 has a single tooth 32a that in the FIGURE 2 position is vertically above shaft 28.

Figure 11:
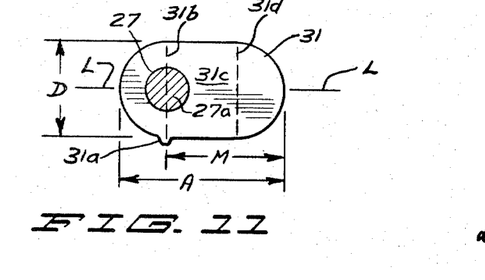
FIGURE 11 is an enlarged view of one of the lobe type sprockets on a crank shaft in the FIGURE 2 position.

As may be noted in FIGURE 11, the lobe type sprocket 31 has a semi-circular portion appearing to the left of dotted line 31b, a generally rectangular portion 31c intermediate dotted lines 31b, 31d that has one edge integrally joined to the diametric edge of the first semi-circular portion, and a second semi-circular portion appearing to the right of dotted line 31d that has a diametric edge integrally joined to the opposite edge of said rectangular portion. Accordingly, the maximum dimension M of the sprocket (of the elongated axis L—L) which passes through the pivot axis 27a of the crank shaft is substantially greater than the maximum dimension D of the sprocket which passes through said pivot axis and is at right angles to the dimension line M, dimension D being two times the radius of curvature of a semi-circular portion of the sprocket 31. Further, the crank arms are joined to their respective crank shafts to extend at substantially right angles to the elongated axis L—L of the lobe type sprockets.

A chain 33 is extended around sprockets 31, 32 in driving relationship through the sprocket teeth 31a, 32a whereby upon moving the chain 33, the sprockets will be pivoted about their respective crank shaft axis to cause the crank shafts to rotate about their horizontal longitudinal axes. In order to drive the chain there is provided a transversely elongated tube 35 that has one end connected to a link of the chain by a connecting member 36 such that said one end of the tube may pivot relative the chain. A ball nut 38 is secured to the end of the tube in threading engagement with the transversely elongated threaded end portion of a Saginaw screw 39 such that the screw extends into the tube 35 and may be transversely moved relative said tube.

The screw 39 has an intermediate non-threaded portion journalled for rotation in bearing 40 (only one shown) such that the screw cannot move axially relative the bearings, the bearings in turn being secured to housing 44 of the transmission generally designated 41. The opposite, non-threaded end portion of the screw 39 is located within the transmission housing and has a gear 42 keyed thereto.

The gear 42 is in driven relationship to worm gear 43 which provides suitable speed reduction. The worm gear is keyed to shaft 47 that is rotatably mounted in housing 41 and is coupled to the motor shaft (not shown) of motor 48 to be driven thereby, the housing of the motor being suitably secured to the transmission housing in a conventional manner such as being bolted thereto. The motor extends longitudinally forwardly of the housing, there being provided an aperture 49 in the front wall 26a for the motor to extend through. One axial end of the motor is provided with a pivot connecting member 51 that is secured to a brace 52, while the transmission housing is provided with a pivot stud 53 in longitudinal axial alignment with the pivot member 51. Stud 53 is pivotally secured to the inner surface of the housing rear wall 26b by a suitable mounting member 54. The bracket 52 has an opposite end fixedly attached to the housing front wall 26a by being bolted thereto at 55. As a result of providing pivot members 51, 53, the transmission 41 and the motor 48 are attached to the housing 26 so that they can pivot about a horizontal longitudinal axis relative the housing 26, the purpose of providing for limited pivotal movement of the transmission and motor relative housing 26 being set forth hereinafter.

The one ends of two crank arms have inner portions 57, 58 respectively secured to crank shaft 27, 28 to extend radially outwardly therefrom. Advantageously the crank arms are of rectangular-tubular shape. Telescopically extending into each inner crank arm portion is an outer crank arm portion 61, each crank arm portion 61 being secured to an inner crank arm portion by nuts and bolts 62. The crank arm portions are provided with radially spaced apertures for receiving the bolts whereby the effective radial length of the crank arms may be adjusted. The radially outer ends of each of the crank arm portions 61 is welded to a forward end portion of a platform shaft 63 to extend radially relative thereto. Each platform shaft 63 extends parallel to the crank shafts and has a support bearing 65 that in turn mounts a collar member 66 for pivotal movement relative the shaft 63. A bolt 67 is extended through an aperture in each collar member and threaded into the adjacent shaft 63 to prevent axial movement of the collar member relative the platform shaft while at the same time permitting the collar member to pivot relative said shaft. Each collar member has outwardly extending, diametrically opposed studs 68 that are respectively extended through opposed legs of the generally U-shaped platform braces 69. As may be noted from FIGURES 1 and 6, the generally U-shaped braces 69 are elongated to extend radially relative studs 67, the web portions of braces 69 being welded to the loading platform 23. By providing the above mounting of the platform on shafts 63, the platform may be pivoted from the generally horizontally extending condition of FIGURE 5 to the vertically extending condition of FIGURE 1.

Figures 5, 6, 7:
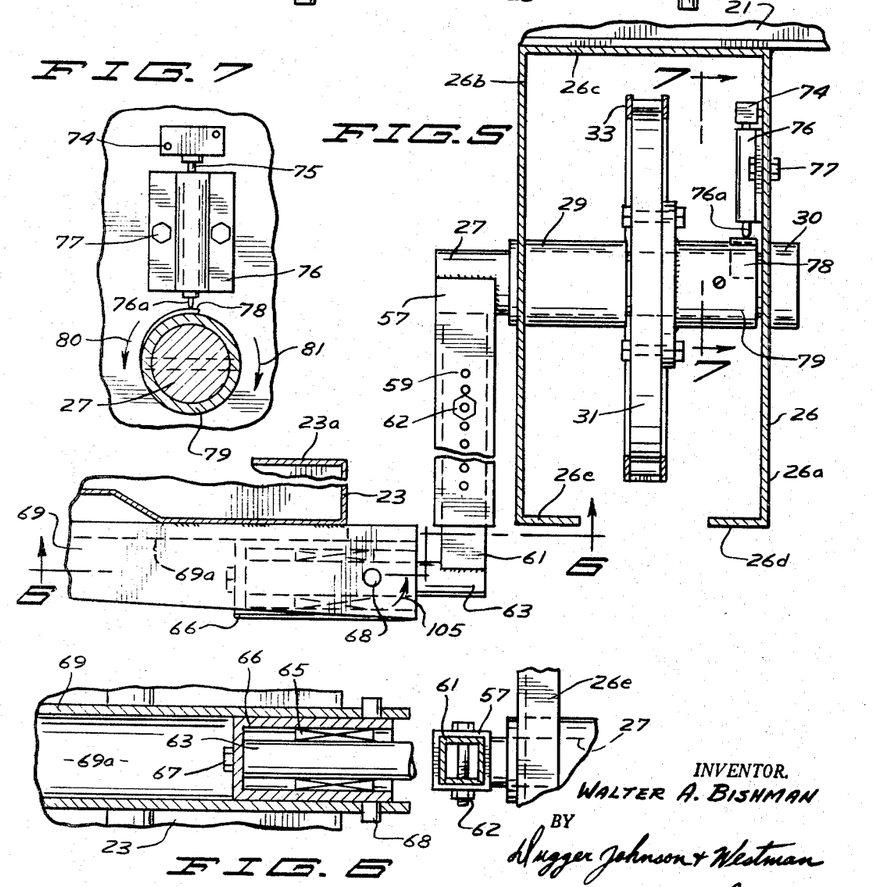
FIGURE 5 is a longitudinal cross sectional view of the first embodiment generally taken along the line and in the direction of the arrows 5—5 of FIGURE 2 with a portion of the crank arm being broken away to illustrate the mounting of the lower limit switch and a portion of the platform in a platform fully lowered condition.
FIGURE 6 is a fragmentary horizontal cross sectional view of the first embodiment generally taken along the line and in the direction of the arrows 6—6 of FIGURE 5 to show the mounting of the combination tailgate-platform whereby the said combination may be moved from a generally horizontally extending condition to a generally vertically extending condition.
FIGURE 7 is a fragmentary transverse cross sectional view generally taken along the line and in the direction of the arrows 7—7 of FIGURE 5 to show the lower limit switch operating structure.

In order to automatically stop the motor 58 when the platform is in fully lowered position, there is provided a lower limit switch 74 that is bolted to the front wall 26a vertically above the crank shaft 27 (see FIGURES 5 and 7). Switch 75 includes a push button switch member 75 operated by the plunger 76a of the switch actuator 76 which is located between switch 74 and shaft 27. The switch actuator is mounted by being bolted at 77 to the front wall 26a.

The plunger is located in position to ride on a generally arcuate cam 78 that is welded to a collar 79 and on collar 79 when the shaft is in an appropriate angular position, the collar being keyed to shaft 27 to rotate therewith. With the shaft 27 in the angular position of FIGURES 5 and 7 wherein the crank arms extend vertically downwardly relative the crank shafts, the maximum radial thickness portion of the cam 78 is directly beneath the plunger 76a whereby the switch member 75 is held in an open condition. Accordingly, the electric circuit to energize the motor is broken and the motor will not cause the shaft 27 to turn further in a direction of the arrow 80. To be noted is that the cam is of a progressive smaller radial thickness in the direction of arrow 80.

Figures 8, 9:
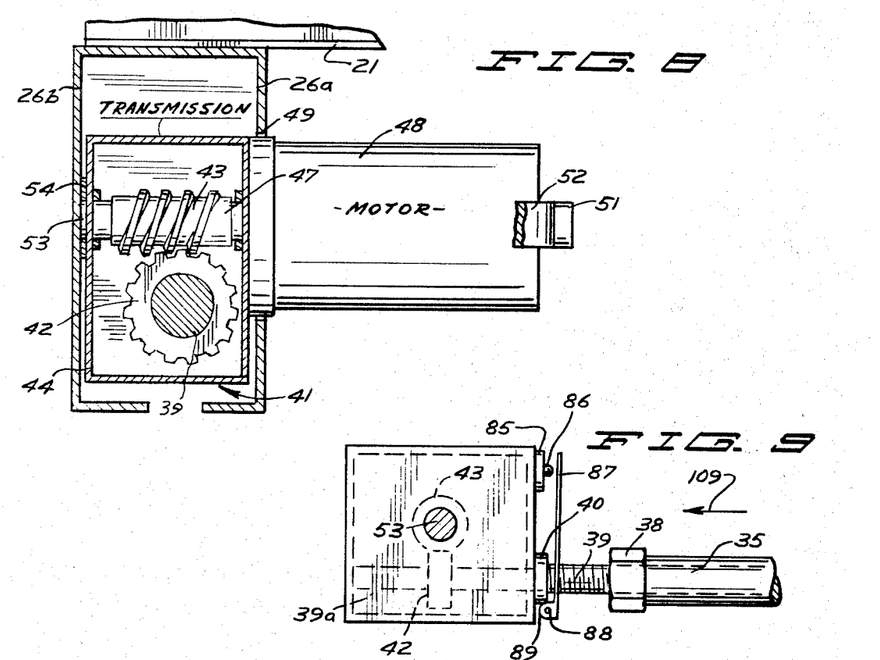
FIGURE 8 is a longitudinally cross sectional view generally taken along the line and in the direction of the arrows 8—8 of FIGURE 4 to show the worm gear drive of the transmission (all the transmission internal structure not shown) and the pivotal mounting of the motor and transmission.
FIGURE 9 is an enlarged fragmentary rear view of the first embodiment showing the mounting of the upper limit switch operating structure and showing the drive connection between the worm gear and screw in dotted lines.

The upper limit switch 85 is bolted to the housing 44 vertically above bearing 40, switch 85 having a normally closed switch member 86 (see FIGURE 9). An elongated switch arm 87 is provided for moving switch member 86 in a transverse direction towards the transmission housing, the lower end of switch arm 87 being pivotally secured at 88 to lugs 89. Lugs 89 are welded to the transmission housing. The screw 39 rotatably extends through an appropriate aperture formed in the switch arm vertically intermediate switch member 86 and pivot member 87.

Figure 10:
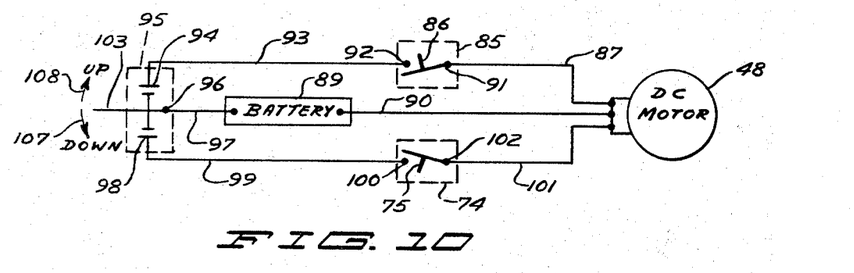
FIGURE 10 is a simplified electric schematic view of the first embodiment showing the connection of the various switches for operating the electric motor.

Referring to FIGURE 10, one pole terminal of a battery 89 of the truck is connected by the line 90 to motor 48 while a line 87 connects the motor to terminal 91 of the switch 85. A second terminal 92 of switch 85 is connected via line 93 to a terminal 94 of the manually operated switch 95. Switch 95 is a manual control switch having a second terminal 96 that is connected via line 97 to an opposite pole terminal of the battery. Switch 95 also includes a third terminal 98 which is connected via line 99 to a terminal 100 of the switch 74. Switch 74 has a second terminal 102 that is connected via line 101 to motor 48. Switches 74, 85 are the type that their switch members 75, 86 respectively, are resiliently urged to connect terminals 100 and 102, and terminals 91 and 92. Accordingly, with switches 74, 85 closed and upon moving the manual movable switch member 103 in the appropriate angular direction to electrically connect terminals 94, 96 current is applied through lines 90, 87 to rotate the motor in one angular direction; or if switch 95 is moved in the opposite direction to electrically connect terminals 96, 98 current is applied in through lines 100, 101 to operate the motor in the opposite angular direction. Switch member 103 is resiliently retained by conventional structure in a condition that terminal 96 is not connected to either of terminals 94, 98.

The structure of the first embodiment of the invention having been described, the use thereof will now be set forth. Assuming the loading platform 23 is also a combination tailgate and is in a closed position such as illustrated in FIGURE 1, the platform 23 is pivoted in direction of arrow 105 about the axis of studs 68 until the web portion of the braces 69 abut against collar members 66. At this time, the platform 23 is in generally horizontally extending condition.

To be indicated is that at the time crank arms are in an elevated condition of FIGURE 1, the ball nut 38 is abutting against switch arm 87 with sufficient force that the switch arm holds the switch member 86 in an open condition. Accordingly, even if the switch member 103 is pivoted in the direction of arrow 108 the motor 48 will not be energized. However, upon pivoting switch member 103 in the direction of arrow 107 there is provided an electrical connection between terminals 96, 98 to energize the motor to drive the transmission to rotate the screw 39 relative nut 38 so that the nut and thereby the tube will transversely move in the direction of the arrow 109 (FIGURE 9). This movement of the tube forces the lower run on the chain 33 to move in the same direction and thereby simultaneously pivot the lobe type sprockets 31, 32 about their respective crankshaft axes in the direction of the arrows 80, 112. Thus the sprockets are moved from the dotted line position of FIGURE 3 to the solid line position of FIGURE 3 and subsequently to the solid line position illustrated in FIGURE 2. Since the sprockets are keyed to the crank shafts, the crank arms are likewise angularly moved in the direction of the arrows 80, 112 respectively to lower the platform.

Due to the provision of the bearings 65 and collar members 66 on the platform shafts 63, as the crank arms are angularly moved, the platform shafts pivot relative the collar members and thereby the platform is maintained in a generally parallel condition as it is arcuately swung to the ground level.

As the crank arms approach their generally vertically downwardly extending position of FIGURE 2, crank shaft 27 is angularly moved to bring the maximum thickness portion of cam 78 beneath plunger 76a. At the time the arms extend vertically downwardly, the cam 78 is angularly moved sufficiently that the plunger 76a moves switch member 75 to break the electrical connection between terminals 100, 102. Accordingly, the DC motor 48 is de-energized and cannot be actuated whereby the crank arms are further moved in the direction of arrows 80, 112 respectively until the crank arms have been moved in the opposite angular direction.

When it is desired to elevate the loading platform, the manually operated switch member 103 is pivoted in the direction of arrow 108 to a position that there is an electrical connection formed between terminals 94, 96 (it being noted that the initial movement of the nut 38 in the direction of arrow 109 relative the screw 39 to lower the platform permitted switch member 86 resiliently urging the switch arm about its pivot axis 88 to a position that said switch member forms an electrical connection between terminals 91, 92). At the time the electrical connection is formed between terminals 94, 96 the motor 48 is energized such that it provides an output drive in an opposite angular direction from that provided at the time the terminals 96, 98 were electrically connected. As a result the screw 39 is rotated in a direction that the ball nut 38 is transversely moved in a direction opposite arrow 109 whereby the lobe type sprockets are moved from the solid line FIGURE 2 position toward the solid line FIGURE 3 position. The first few degrees of movement of sprocket 31 in the direction of arrow 81 results in shaft 27 moving cam 78 angularly to a position that switch member 75 again electrically connects terminals 100, 102.

As may be noted from FIGURE 2, when the crank arms are in their vertical downwardly extending condition, the tooth 31a extends radially downwardly from the axis of crank shaft 27 while the tooth 32b radially extends directly vertically of the axis of crank shaft 28. Further the axis of elongation L—L of each of the lobe type sprockets extend horizontally. However, the elongated axes L—L of the sprockets extend vertically when the crank arms extend outwardly of the crank shafts in a horizontal direction; and thence as the crank arms are further moved to their raised dotted line position of FIGURE 3, the elongated axes L—L are angularly moved toward a horizontal condition extending on the opposite transverse side of the pivot axis 27a and the pivot axis of shaft 28. Thus when the crank arms extend vertically downwardly from shaft 27 as shown in FIGURE 2, a load on the platform does not impart any turning movement to the crank shafts. However, as the crank shafts rotate the sprockets toward the FIGURE 3 solid line condition, the moment of force resisting the turning of the sprockets in directions opposite arrows 80, 112 increases, thus the arcuate edge of sprocket 31 that is to the right of line 31d is progressively brought into contact with the lower run of chain 33 to effectively provide a progressively longer lever arm between shaft pivot axis 27a and the point of tangential contact of the lower run of the chain with said arcuate edge until the elongated axis L—L is vertical. Thereafter, the effective length of said lever arm decreases as sprockets are further rotated in the direction of arrows 81, 111, the length of said lever arm being a maximum when the crank arms extend horizontally and the weight of the load imposing a maximum turning moment of force to the crank shafts opposing the elevation of the load. As a result as the platform shafts are moved from a location vertically beneath the respective crank shafts to a location at a higher elevation than said crank shafts, the same rate of transverse movement of tube 35 toward the transmission will result in a progressive slow rate of angular movement of the crank shafts as the sprockets are moved from the FIGURE 2 position until the elongated axis L—L is vertical, and then a progressively faster rate of angular movement to the dotted line FIGURE 3 position the sprockets being angularly moved the same amount due to the provision of the sprocket teeth. Accordingly through the shape of the sprockets, the motor torque required to move the chain remains substantially the same as the platform is moved from its lowermost to its uppermost position and thus the motor speed remains substantially the same as the platform is moved from ground level to bed level.

Figure 3:
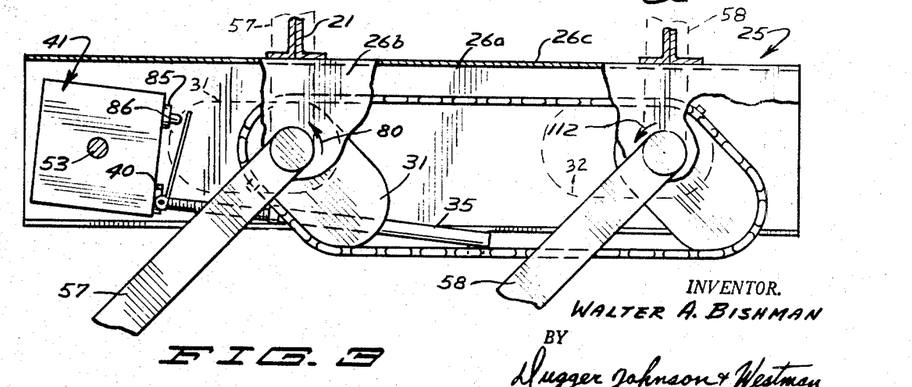
FIGURE 3 is a view of the first embodiment similar to FIGURE 2 other than the crank arms and lobe type sprockets are shown in a partially platform raised condition in solid lines; and in dotted lines in a platform fully raised condition.
Figure 4:
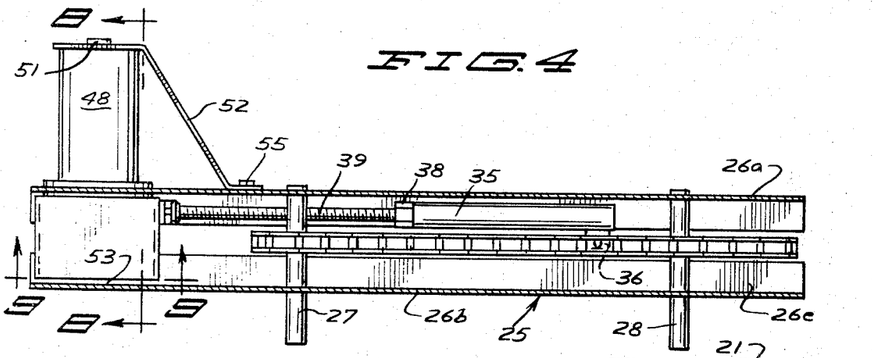
FIGURE 4 is a horizontal cross sectional view generally taken along the line and in the direction of the arrows 4—4 of FIGURE 2.

Further as the tube 35 is moved toward the transmission from the FIGURE 2 position, the lower run of the chain is moved downwardly and to the left as viewed in FIGURE 3. The aforementioned movement of the chain is permitted by the spacing of the adjacent edges of flanges 26d, 26e and the pivotal mounting of the transmission and motor, i.e. note the pivotal movement of the transmission as the crank arms are moved from the FIGURE 2 to the FIGURE 3 position.

As the platform approaches the level of the truck bed of floor 22, the nut 38 is moved closely adjacent switch arm 87. At the time the platform is level with the truck bed 22, nut 38 has forced the switch arm 87 to move switch member 86 to break the electrical connection between terminals 91, 92. As a result motor 48 is stopped.

After a load has been moved off the platform, the platform may be pivoted about studs 68 to the closed position of FIGURE 1 wherein the platform loading surface 23a is moved from a generally horizontal condition to a vertical condition; and thence through suitable fasteners (not shown) the tailgate locked in closed position.

Where the tube for moving the chain is connected to the lower run, the lobe type sprocket may be further elongated to the left of line 31b, i.e. a rectangular intermediate portion 31c and the semi-circular portion illustrated to the left of line 31b since the movement arm of the chain to the crank shafts extends to the right of line 31b (maximum distance of dimension line A), or a corresponding line for sprocket 32.

The first embodiment of the invention has been described with reference to usage on a large truck which has the platform bed located at a relatively high elevation. However, when the invention is to be used with, for example, pick-up trucks that have a platform bed at a substantially lower elevation, the angular position of the crank arms relative the direction of extension of the axes L—L of the sprockets is changed. For pick-up trucks with the tailgate-platform at bed level the crank arms 57, 58 extend at about 40° or 50° above the horizontal and to the left of the respective crank shaft as viewed in FIGURE 3. At this time the sprockets are also elongated to the left so that the axes L—L extend horizontally. As thus modified the upper and lower limit switch controls and the position of the ball nut on the screw are modified so that as the sprockets are rotatable by the DC motor between the crank arm 40° or 50° angular position and a ground level angular position, the crank arms are moved to extend directly vertically downwardly from the respective crank shaft at the ground level position. That is, when the platform of a pick-up is at ground level, the sprockets 31, 32 are not rotated in the direction of arrows 80, 112 to the horizontal position of FIGURE 2.

Referring now in particular to FIGURES 12–16, there is illustrated the rear portion of a truck box, generally designated 120, that is mounted on a chassis frame 121 of a truck. The truck box includes a floor or bed 122 that is attached to the chassis frame, and a combination tailgate-loading platform 123. The loading platform 123 constitutes a part of the loading platform apparatus, generally designated 125, of the second embodiment of the invention.

The apparatus 125 includes a closed housing 126 having parallel, vertical, transversely extending front and rear walls 126a and 126b respectively, parallel top and bottom walls 126c and 126d respectively that have opposite transverse edges respectively joined to walls 126a and 126b, and end walls 126e and 126f. As may be noted from FIGURES 12–14, top wall 126c is dependingly secured to the chassis frame 121 such that the rear wall 126b extends substantially parallel to the rear edge 122a of the truck bed or floor 122.

There are provided a pair of parallel longitudinally extending, transversely spaced crank shafts respectively designated 127 and 128 that are extended through and rotatably mounted by bearings 129 and 130 that are respectively extended through the rear wall and front wall. A pair of longitudinally spaced control arms 131 have their one end portions welded to an annular member 124 that is keyed to shaft 127 intermediate the bearings 129, 130 such that the arms extend parallel to one another; while a second pair of corresponding control arms 132 are likewise welded to an annular member 124 that is keyed to shaft 128. The one end of an elongated tie bar or link 133 extends between the opposite ends of arms 131 and pivotally connected thereto by a pivot member 134, while the opposite end of link 133 is likewise pivotally connected by a pivot member 135 to the opposite ends of arms 132. The pivot member 135 also mounts the one end of a pair of operating arms 136 longitudinally outwardly of arms 132, the opposite end of arms 136 being pivotally connected by pivot studs 137 to the ball nut assembly, generally designated 138. The assembly 138 includes a ball nut 145 having internal threads in threading engagement with the transversely elongated, immediate threaded portion 139b of a Saginaw screw 139 such that as the screw rotates relative the ball nut, the ball nut assembly moves transversely (axially) relative the screw.

The screw 139 has a non-threaded end portion 139c journalled for rotation in a bearing 140 such that the screw can move a limited amount axially relative the bearing, the bearing in turn being mounted by a vertical bar 141 that extends between operating arms 136 and intermediate the ball nut and pivot member 135. The bar 141 is bolted to the housing top and bottom walls.

In order to limit the movement of the ball nut assembly in a direction (arrow 185) toward bar 141, a steel metal stop block 166 is bolted to screw portion 139b adjacent bar 141. The ball nut assembly includes a frame member 167 secured to the ball nut to move therewith, said frame member mounting a steel block 168 to extend more closely adjacent bar 141 than the frame member and in a position to strike block 166 when the platform in a horizontal condition has been elevated to truck bed level.

The opposite, non-threaded end portion of the screw 139a, which extends adjacent to end wall 126f, is supported by a bar member 146 that acts as a bearing and also a thrust member, the opposite ends of the bar member being bolted to the housing front and rear walls. A gear (combination gear and clutch pad) 142 is mounted on screw end portion 139a intermediate the threaded portion 139b and member 146 for rotational movement relative to said screw, said gear being in driven relationship to worm gear 143 which provides suitable speed reduction. The worm gear is keyed to the longitudinally extending shaft 152. The worm gear shaft 152 at one end is rotatably mounted by a mounting member 149 which in turn is mounted by the housing rear wall, the opposite end of the worm gear shaft being coupled to one end of the motor shaft 148a of a motor 148 by a coupling member 150 to rotate therewith. The motor is bolted to the housing front wall to extend forwardly thereof and have its shaft rotatably extended through the front wall.

The screw end portion 139a is of a reduced diameter to form a shoulder 147 with the screw threaded portion 139b. An annular member 155 is mounted on end portion 139a in abutting relationship with shoulder 147, a spring washer 156 being mounted on end portion 139a between and in abutting relationship with annular member 155 and clutch pad 157. Clutch pad 157 has a keyway into which the key 160 on screw end portion 139a extends to permit limited axial movement of the clutch pad relative the screw, and at the same time preventing rotation of the clutch pad independent of the screw. A clutch liner 158 is mounted on screw portion 139a to have an annular surface in abutting relationship with clutch pad 157 on the side opposite the spring washer, the opposite surface of the clutch liner abutting against an annular surface of the driven gear 142. Through the provision of the spring washer, the clutch pad is resiliently urged toward the driven gear whereby through the clutch liner a driving force may be transmitted from the driven gear 142 to said clutch pad.

The driven gear 142 is prevented from moving axially toward the thrust bearing member 146 due to the provision of the thrust bearing, designated by bracket 162, that is provided on the screw end portion 139a intermediate said gear 142 and member 146. On the transverse opposite side of bearing member 146 from the thrust bearing 162, a nut 164 is adjustably threaded on end portion 139a and pinned to the screw to limit the amount of transverse movement of the screw in the direction of arrow 185.

There are provided two crank arms 170, 171 that respectively are preferably of the same construction as the crank arms described with reference to the first embodiment, crank arms 170, 171 having inner end portions respectively secured to crank shafts 127 and 128 to rotate therewith. The outer end of each crank arm mounts a platform shaft 172 to extend parallel to the crank shafts; each platform shaft in turn mounting a brace mounting assembly that permits the platform to be pivoted from a generally horizontally extending condition of FIGURE 12 and to permit the crank shaft rotating relative said platform as the platform is moved from the ground level to the truck floor level. The brace mounting assembly is not illustrated with reference to the second embodiment as it advantageously may be of the construction and function the same as described with reference to the combination of members 65–68 of the first embodiment for connecting a shaft 172 to a platform brace 174. Braces 174 are in turn welded to the platform 123.

In order to prevent the ball nut assembly from rotating as it is translated along the screw 139, the vertical plate 167a of the frame member 167 extends adjacent to the bottom wall of the housing, plate 167a having a bracket 178 bolted thereto at 179. Bracket 178 has a longitudinally elongated web portion 178a that extends generally parallel to the housing end walls and a leg 178b joined to each end of the web portion to extend generally parallel to the housing front and rear walls. Each leg portion has an adjustment bolt 180 threaded thereinto to form or substantially form a sliding contact with the housing front wall and rear wall respectively. Further, the lower edge of bracket 178 slidingly contacts the housing bottom wall. Accordingly, the ball nut assembly is prevented from rotating as the screw is rotated, but at the same time is free to be translated relative the housing as the screw is rotated.

Figure 13:
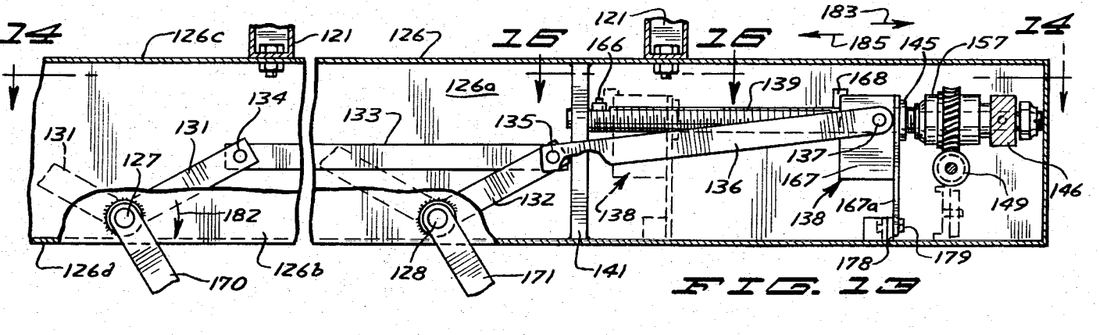
FIGURE 13 is a fragmentary rear elevational view of the second embodiment of loading platform apparatus of this invention with an intermediate portion thereof and most of the housing rear wall being broken away, said view showing the control arms and ball nut assembly in a platform ground level position in solid lines and a fully raised position in dotted lines.

Referring to FIGURE 13, one pole terminal of a battery 89 of the truck is connected by the line 90 to motor 148 while a line 193 connects the motor to a terminal 94 of the manually operated switch 95. Switch 95 is a manual control switch having a second terminal 96 that is connected via line 97 to an opposite pole terminal of the battery. Switch 95 also includes a third terminal 98 which is connected via line 194 to the motor. Upon moving the manual movable switch member 103 in the appropriate angular direction to electrically connect terminals 94, 96 current is applied through lines 90, 193 to rotate the motor in one angular direction; or if switch 95 is moved in the opposite direction to electrically connect terminals 96, 98 current is applied in through lines 194, 90 to operate the motor 148 in the opposite angular direction. Switch member 103 is resiliently retained by conventional structure in a condition that terminal 96 is not connected to either of terminals 94, 98.

Figures 12, 14:
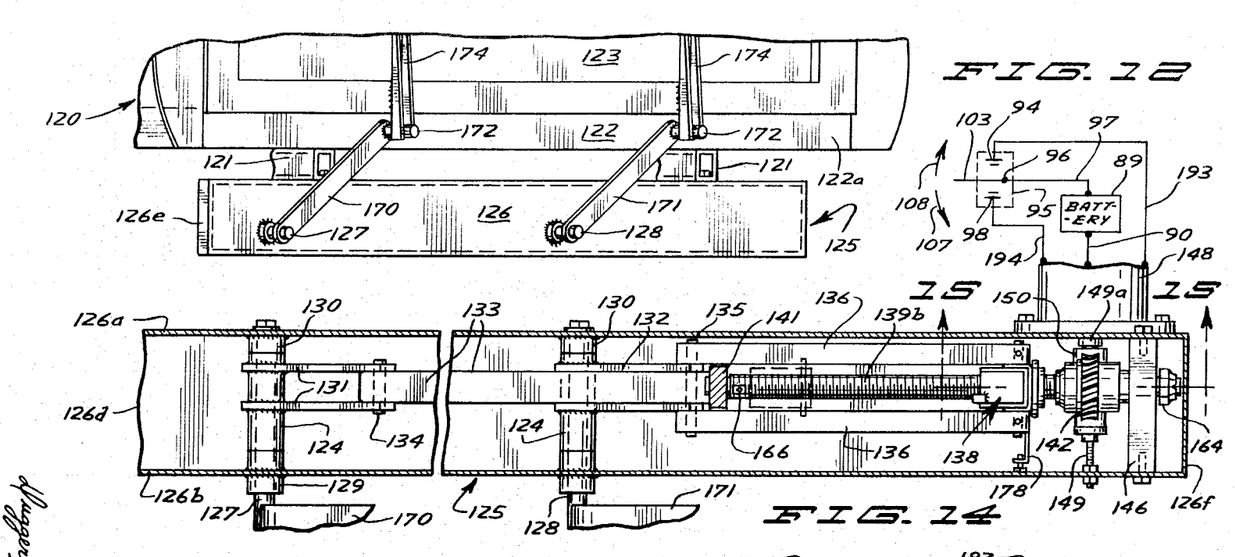
FIGURE 12 is a fragmentary perspective view of the rear portion of a truck showing the second embodiment of the combined tailgate and loading platform apparatus of this invention in a fully elevated tailgate closed position.
FIGURE 14 is a horizontal cross sectional view generally taken along the line and in the direction of arrows 14—14 of FIGURE 13, said view also schematically showing a simplified electric circuit for the motor.
Figure 15:
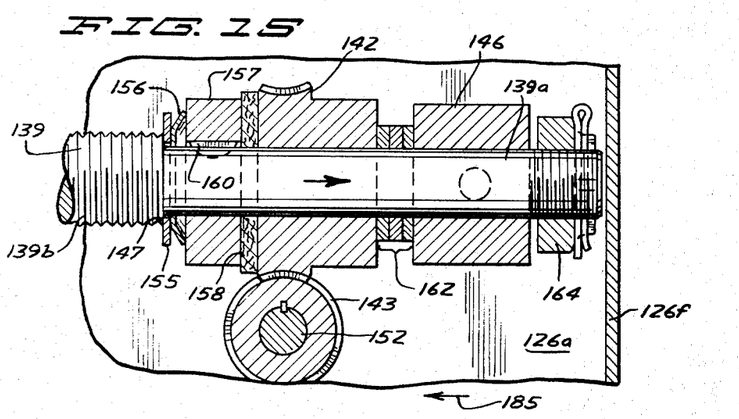
FIGURE 15 is an enlarged fragmentary view, generally taken along the line and in the direction of the arrows 15—15 of FIGURE 14, of the power driven end portion of the screw and the mechanism for driving the screw, the structure mounted on the screw being illustrated in cross section.
Figure 16:
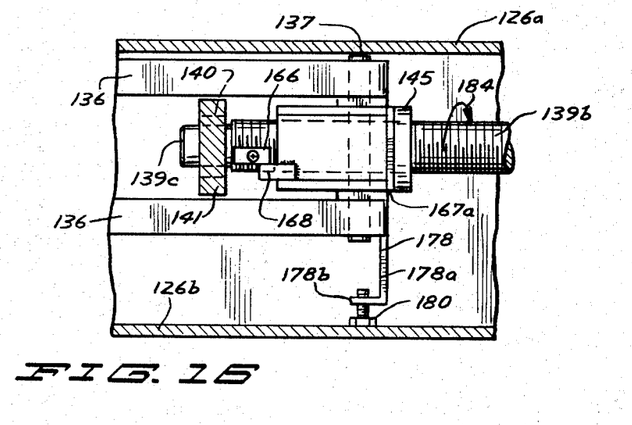
FIGURE 16 is an enlarged horizontal view generally taken along the line and in the direction of the arrows 16—16 of FIGURE 13 other than the ball nut assembly is located in the platform fully elevated position.

The structure of the second embodiment of the invention having been described, the use thereof will now be set forth. Assuming the loading platform 123 is also a combination tailgate and is in a closed position such as illustrated in FIGURE 12, the platform 123 is pivoted relative the platform shafts to a position to extend generally horizontal and parallel to said shafts. At this time, the ball nut assembly block is abutting against the screw block 166 such as illustrated in FIGURE 16. Now, with a load being moved onto the platform, the weight of the load exerts a force through the ball nut assembly to move the screw axially in the direction of arrow 183 to space nut 164 from bar member 146 such as illustrated in FIGURE 15, provided the screw is not already in this position. Thus the resulting force acts such that the screw is axially moved sufficiently in the direction of arrow 183 relative the thrust bar 146 that the screw shoulder 147 acting through members 155 and 156 will force and retain the clutch pad 157 in sufficient frictional engagement with the clutch liner 158 whereby the rotation of the worm gear upon actuation of the motor in appropriate direction will, through gear 142, apply a driving force to rotate the clutch pad and screw in the direction of arrow 184. Thus, upon moving switch 103 in the direction of arrow 107, terminals 96, 98 are connected to actuate motor 148 to rotate in the proper direction for lowering the platform. Since the ball nut assembly is prevented from rotating and the screw is rotated in the direction of arrow 184, the ball nut assembly is moved in the direction of arrows 183 and results in the crank arms pivoting about the respective crank shafts axis in the direction of arrow 182 to lower the platform.

The lowering movement of the platform is limited in three ways: (1) a built-in mechanical stop, or (2) the platform hits the ground (ground level), or (3) the platform hits an object above the ground. For the specific structure illustrated, the mechanical stop to limit the lowering movement is the rotation of control arm 132 sufficiently in the direction of the arrow 182 about its crank shaft axis to abut against bar 141. At the time the lowering movement of the platform is limited in one of the three mentioned ways, the weight of the platform and/or the load thereon does not exert a force acting on the operating arms 136 tending to move them in the general direction of arrow 183. However, the screw continues to rotate and tends to move the ball nut assembly in the direction of the arrow 183. Since the arms 136 at this time prevent the ball nut assembly from moving in this direction, the continued turning of the screw in the direction of arrow 184 results in the screw being axially moved in the direction of arrow 185 relative the thrust bar member 146. However, this movement is limited by the nut 164 being brought into abutting engagement with member 146, and is not sufficiently great that when the direction of rotation of the screw is reversed, that the drive force will not be applied from gear 142 to result in the screw being rotated to move in the direction of arrow 183.

As the screw is moved in the direction of arrow 185, the spacing between shoulder 147 and gear 142 is increased, and accordingly the amount of force acting against the clutch pad for retaining it in frictional engagement with the clutch liner 158 and the clutch liner 158 in frictional engagement with gear 142 is decreased sufficiently that the continued rotation of gear 142 in the direction of arrow 184 will not result in any turning movement being applied through the clutch pad 157 to the screw. That is, at this time, approximately 95% of the driving force is released to thereby allow the gear 142 to rotate while the screw does not rotate. This prevents damage and destruction in the event that the motor switch is not operated to the stop position by the operator.

Assuming now that a load is on the platform when the platform is in its lower limit position and it is desired to raise the load, switch 103 is moved to connect terminals 94, 96 to actuate the motor to turn gear 142 in the direction opposite arrow 184. With platform at its lower level limit position, gear 142 would spin freely if it were not for the provision of the spring washer 156. However, the spring washer keeps constant pressure on a clutch pad 157 to the liner to gear 142 to thereby keep the clutch loaded so that the screw is forced to rotate. That is, even with no load on the platform, when gear 142 is rotated in the direction opposite arrow 184, the spring washer 156 applies sufficient force against the clutch pad 157 that a friction drive to rotate the screw would be applied from the gear 142 through to the clutch pad 157 so that the platform may be elevated.

With a load on the platform, the weight force is transferred through the crank arms and operating arms to the ball nut assembly to urge the ball nut assembly to move in the direction of arrow 183 and thereby the screw in this same direction. Thus the heavier the load on the platform, the more force is applied to tighten the clutch (shift the screw axially in the direction of arrow 183) and move the clutch pad 157 more closely adjacent gear 142 to insure rotation of the screw in the direction opposite arrow 184. Accordingly, at this time the ball nut assembly is translated in the direction of arrow 185 from the solid line FIGURE 13 position to the dotted line FIGURE 13 position. As the ball nut assembly approaches the FIGURE 13 dotted line position, the platform is moved upwardly adjacent the level of the truck bed. At this time the stop block 168 is adjacent the screw block 166 and the rotation of the screw will bring the screw block into abutting contact with the stop block 168 when the platform has been fully elevated. Since the screw block 166 abuts against the stop block 168 and a driving force is being applied through the clutch liner and pad to the screw, the screw shifts axially sufficiently in the direction of arrow 185 that there is slippage between the clutch pad 157 and gear 142, and the clutch continues to slip until the motor is deactivated. It is to be noted that because the screw block is attached at a certain predetermined exact spot on the screw, it will always limit the movement of the ball nut assembly (to the left as illustrated in FIGURES 13 and 14) and thereby limit the upward movement of the platform to a predetermined level in relation to the floor of the truck. When the motor is deactuated, the load on the platform will result in the screw and ball nut assembly being shifted in the direction of arrow 183 a limited amount, this shifting being limited by the screw shoulder acting through members 155–158, 142, and 162 to transmit the force to the thrust member 146.

To be mentioned is that control arms 131, 132 extend outwardly from the respective crank shaft axis at right angles to the direction of extension of arms 170, 171. Further, when the crank arms 170, 171 extend horizontally, the control arms extend vertically. Accordingly, at the time the load on the platform exerts a maximum turning moment on the crank arms resisting the upward movement of the load, the control arms are exerting a maximum turning moment on the crank shafts to raise the load. Additionally, the more nearly the crank arms approach the vertical, the more nearly the control arms approach a horizontal condition. Also the operating arms are at their maximum angle of inclination with the horizontal at the time the control arms form a minimum angle with the horizontal. Accordingly, the motor torque required to move the ball nut assembly remains substantially the same as the platform is moved from its lowermost to its uppermost position and the motor speed remains substantially the same as the platform is moved between said positions.

With the structure described and illustrated with reference to the second embodiment, the operating arms exert a pushing force to move the platform to an elevated condition. However, if the clutch and drive mechanism is mounted on the left hand end of the housing as contrasted to the right hand end as illustrated in FIGURES 13 and 14 and the relationship of the crank arms and control arms remain the same as that illustrated in FIGURES 12–14, then the operating arms would apply a pulling force to raise the platform and this would necessitate that all of parts 147, 156, 156, 158, 142 be placed on the right hand side of the member 294 which would then be located in the left hand end of the housing. However, the mechanical principle described with reference to FIGURES 12–16 would still remain the same. Further, the screw stop block and the ball nut assembly block would have to be relocated so that their functions would still remain the same.

With reference to the second embodiment the housing is completely closed and sealed so that it may be filled with oil.

Even though the invention has been described with reference to a combination tailgate-loading platform, it is to be understood that, for example, platform 23 may be directly mounted on the collar member 66 (eliminate studs 68). In such a case the platform would not be movable from a horizontal to a vertical tailgate position. Also, it is to be understood that even though the loading platforms as described and illustrated are located at the rear end of a truck, it is to be understood that with flat bed trucks or those having openings for side loading, the apparatus of this invention may be mounted alongside the truck bed instead of adjacent the rear of the truck.

The apparatus of this invention eliminates the problems encountered with conventional hydraulically operated truck loading platform apparatus, for example, line leakage of the hydraulic fluid. Further, the apparatus of this invention works easily as well in summer and winter as the loading platform is power driven not only from ground level to truck bed level, but also from truck bed level to ground level.

What I claim is:

1. Apparatus attached to the frame of a vehicle for moving a load between ground level and the level of a vehicle bed comprising a housing, a pair of crank shafts rotatably mounted on the housing in horizontal spaced relationship to have parallel axis of rotation, an elongated crank arm for each crank shaft having one end portion joined to the respective crank shaft to rotate therewith and an opposite end portion, a platform shaft for each crank arm joined to the respective crank arm to extend generally parallel to the crank shafts axis of rotation, a loading platform having a loading surface, bearing means mounted on each platform shaft for connecting an adjacent portion of the platform to the respective platform shaft to permit the platform shafts pivoting relative the platform as the platform shafts are moved by the crank arms, means mounted in driving relationship to the crank shafts for simultaneously rotating said crank shafts in the same angular direction the same angular amount between platform ground level and bed level positions and retain said crank shafts angularly relative one another that the crank arms extend generally parallel to one another, and power means for selectively operating the crank shaft rotating means.

2. The apparatus of claim 1 further characterized in that the power means includes a motor and that the crank shaft rotating means includes means for maintaining a nearly constant torque on the motor as the crank shafts are rotated between a platform ground level and bed level positions.

3. The apparatus of claim 1 further characterized in that said crank shaft rotating means includes a lobe type sprocket for each crank shaft keyed to the respective crank shaft, a chain extended around said sprockets in driving relationship thereto, an axially elongated screw having a threaded end portion, means for mounting said screw to drivingly connect the screw to the power means to be rotated thereby while holding said screw against axial movement and elongated means having one end portion pivotally connected to the chain and an opposite end portion threadingly mounted on said threaded portion for moving said chain to rotate said sprockets as the screw is rotated.

4. The apparatus of claim 1 further characterized in that said crank rotating means includes a first control arm having one end portion secured to one crank shaft to rotate therewith and an opposite end portion, a second control arm having one end portion secured to the other crank shaft to rotate therewith and an opposite end portion, a tie bar having one end portion pivotally connected to the first control arm opposite end portion and an opposite end portion, means for pivotally connecting the tie bar to the second control arm opposite end portion at a location the tie bar retains the control arms in parallel relationship, and first means connecting the power means to the pivot means for moving the pivot means and the tie bar to through the control arms rotate the crank shafts when the power means is actuated and the platform is to be moved between said levels.

5. The apparatus of claim 4 further characterized in that the first means comprises an axially elongated screw, means mounting the screw in the housing for rotational movement and limited axial movement, means mounted on the screw and connected to the pivot means for moving the pivot means as the screw rotates, and second means mounted on the screw for drivingly connecting the power means to the screw to rotate the screw and automatically interrupting the rotational movement of the screw when the platform has been moved to ground level and to bed level with the power means actuated.

6. The apparatus of claim 5 further characterized in that the second means includes a clutch assembly for drivingly connecting the power means to the screw.

7. The apparatus of claim 5 further characterized in that the second means includes a stop block connected to the screw for abutting against the first means to stop rotation of the screw in a direction to elevate the platform when the platform is at bed level, and clutch means for drivingly connecting the power means to the screw and automatically permitting the power means to rotate in a direction to elevate the platform when the stop block abuts against the first means and the screw remains stationary.

8. Apparatus attached to the frame of a vehicle for moving a load between ground level and the level of a vehicle bed comprising a housing, a pair of crank shafts rotatably mounted on the housing in spaced relationship, an elongated crank arm for each crank shaft and attached to the respective crank shaft to rotate therewith, a loading platform having a load supporting surface, means mountingly attaching the loading platform to the crank arms for movement therewith and relative thereto to retain the loading platform to have its loading surface generally horizontal as the crank arms are moved to move said platform between ground level and the level of the vehicle bed, means connected to the crank shafts to simultaneously rotate said shafts the same angular amount to move the crank arms and thereby the loading platform between ground level and the level of the bed, first means movable between two positions and connected to the crank shaft rotating means for operating said rotating means, an elongated screw having a thread portion operatively connected to said first means for moving said first means between its positions as the screw is rotated, a motor, and means for mounting said screw and drivingly connecting the screw to the motor to be rotated thereby, and control means for selectively actuating said motor.

9. The apparatus of claim 8 further characterized in that the first means includes a first lobe type sprocket keyed to one crank shaft, a second lobe type sprocket keyed to the other crank shaft, and a chain extended around said sprockets in driving relationship thereto.

10. The apparatus of claim 8 further characterized in that said screw has a first non-threaded end portion and a second non-threaded end portion, and that the means for mounting the screw and drivingly connecting the screw to the motor to be rotated thereby includes second means mounted in the housing for mounting the first end portion for rotary movement and axial movement relative the housing, third means for mounting the second end portion for rotary movement and axial movement relative the housing, fourth means mounted on the second end portion and acting in cooperation with the third means for limiting the axial movement of the screw relative the housing between a first position and a second position, said fourth means including a friction clutch assembly for transmitting a sufficient driving force from the power means to the screw to rotate the screw when the screw is in the first axial position and interrupt rotation of the screw when the screw is in its second axial position.

11. The apparatus of claim 10 further characterized in that said screw and first means have cooperating means to block rotation of the screw in a direction that the platform is being elevated when the platform is at bed level and the first means is in one of its positions, said first means in its said one position exerting a force on the screw to move toward its second axial position.

12. The apparatus of claim 11 further characterized in that said clutch assembly includes a gear rotatably mounted on the screw second end portion in driven relationship to said power means, fifth means mounted on the screw intermediate the third means and the gear to maintain a given minimum predetermined spacing between the gear and the third means, a clutch liner mounted on the screw in abuttable relationship with the gear opposite the fifth means, a clutch pad keyed to the screw second end portion for limited axial movement adjacent the clutch liner on the opposite side of the liner from said gear and means mounted on the screw for resiliently urging the clutch pad toward the gear and third means, said screw in moving from its first axial position to its second axial position moving in a direction that its second end portion is more closely adjacent said second means.

13. The apparatus of claim 12 further characterized in that the first means includes an elongated control arm having a first end portion connected to one of the shafts to rotate the shaft and an opposite end portion, a ball nut assembly having a threaded portion engaging said screw threaded portion and movable between a ball nut assembly platform bed level position and a ball nut assembly platform ground level position, and sixth means connecting the ball nut assembly to said control arm opposite end portion for moving the control arms between a control arm platform bed level position and a control arm platform ground level position, said control arm being of sufficient length to abut against said second means when the control arm is in its platform ground level position to through the sixth means terminate the movement of the ball nut assembly as it is moved toward and to its platform ground level position and thereby move the screw toward its second axial position.

14. Apparatus attached to the frame of a vehicle for moving a load between ground level and the level of a vehicle bed comprising a housing, a pair of crank shafts rotatably mounted on the housing in spaced relationship, an elongated crank arm for each crank shaft and attached to the respective crank shaft to rotate therewith, a loading platform having a load supporting surface, means mountingly attaching the loading platform to the crank arms for movement therewith and relative thereto to retain the loading platform to have its loading surface generally horizontal as the crank arms are moved to move said platform between ground level and the level of the vehicle bed, means connected to the crank shafts to simultaneously rotate said shafts the same angular amount to move the crank arms and thereby the loading platform between ground level and the level of the bed, power means connected to the crank shaft rotating means for operating said rotating means and control means for selectively activating said power means, said crank shaft rotating means including a sprocket for each crank shaft that is keyed to the respective crank shaft, each of said sprockets being a lobe type sprocket having an axis of elongation extending at generally right angles to the direction of elongation of the respective crank arm relative the respective crank shaft, a chain extended around said sprockets in driving relationship thereto and means connecting said power means to said chain for moving said chain to rotate said sprockets when said power means is actuated.

15. The apparatus of claim 14 further characterized in that said means for connecting the power means to the chain includes an axially elongated screw having a threaded end portion, means for mounting said screw to drivingly connect the screw to the power means to be rotated thereby while holding said screw against axial movement and elongated means having one end portion pivotally connected to the chain and an opposite end portion threadingly mounted on said threaded portion for moving said chain to rotate said sprockets as the screw is rotated.

16. The apparatus of claim 15 further characterized in that said power means and means for mounting and driving said screw includes a motor, a transmission and means mounting said motor and transmission on the housing for pivotal movement about an axis generally parallel to the axis of rotation of a crank shaft.

17. The apparatus of claim 16 further characterized in that said platform mounting means includes an axially elongated platform shaft for each crank arm and attached thereto to extend generally parallel to the crank shaft axis of rotation, and means for mountingly attaching the adjacent portion of the platform to the platform shaft to move therewith and pivot relative thereto as the respective crank arm is moved by its crank shaft.

18. Apparatus attached to the frame of a vehicle for moving a load between ground level and the level of a vehicle bed comprising a housing, a pair of crank shafts rotatably mounted on the housing in spaced relationship, an elongated crank arm for each crank shaft attached to the respective crank shaft to rotate therewith, a loading platform having a load supporting surface, means mountingly attaching the loading platform to the crank arms for movement therewith and relative thereto to retain the loading platform with its loading surface generally horizontal as the crank arms are moved to move said platform between ground level and the level of the vehicle bed, a lobe type sprocket keyed to each crank shaft, and means mounted in driving relationship to said sprockets to move the shafts to move the crank arms and thereby the loading platform between ground level and the level of the bed, power means connected to the sprocket driving means for operating said driving means, and control means for selectively activating said power means.

19. The apparatus of claim 18 further characterized in that each of said sprockets is of generally similar shape and has a maximum radial dimension extending outwardly from the respective crank arm in the same direction as the other sprocket, and that the sprocket driving means includes a chain extended around said sprockets and means drivingly connected to the power means for moving the chain to rotate the sprockets.

20. The apparatus of claim 19 further characterized in that each sprocket has a single tooth, that each of said sprockets has an arcuate portion that has said maximum radial dimension and that the last mentioned means is pivotally connected to a run of the chain that as the chain is moved, the said arcuate portion of one sprocket is moved into abutting relationship with said run and the other sprockets arcuate portion is moved out of abutting relationship with said run.

21. Apparatus attached to the frame of a vehicle for moving a load between ground level and the level of a vehicle bed comprising a housing, a pair of parallel crank shafts rotatably mounted on the housing in spaced relationship, an elongated crank arm for each crank shaft and attached to the respective crank shaft to rotate therewith, a loading platform having a load supporting surface, means mountingly attaching the loading platform to the crank arms for movement therewith and relative thereto to retain the loading platform to have its loading surface generally horizontal as the crank arms are moved to move said platform between ground level and the level of the vehicle bed, first means connected to the crank shafts to simultaneously rotate said shafts the same angular amount to move the crank arms and thereby the loading platform between ground level and the level of the bed, and power means connected to the crank shaft rotating means for operating said rotating means, said first means including an axially elongated member having an axis of elongation, means for mounting said member in the housing for rotary movement about said member axis and limited axial movement between a first axial position and a second axial position, a gear mounted on said member for rotation relative thereto about the member axis, and second means mounted on said member and acting in cooperation therewith for transmitting a force from said gear through said crank shafts to rotate said crank shafts to move the crank arms between positions that the platform is at ground level and the level of the bed and automatically moving the elongated member from its first position to its second position to terminate rotation of the crank shafts when the platform is at one of said levels, said second means including third means connected to the crank shafts for simultaneously rotating said crank shafts.

22. The apparatus of claim 21 further characterized in that said elongated member comprises a rotatable screw having an axially elongated thread portion, and that the third means includes a ball nut assembly in threaded engagement with the screw threaded portion, means attached to the ball nut assembly to coact with the housing for blocking rotary movement of the assembly with the screw, and means for connecting the ball nut assembly to the crank shafts to rotate the crank shafts as the ball nut assembly moves axially relative the screw, said screw is rotating moving the ball nut assembly axially relative thereto.

23. The apparatus of claim 21 further characterized in that said elongated member comprises an axially elongated screw having an axially intermediate portion, that said third means comprises fourth means mounted on said threaded portion for substantially only axial movement relative to said screw as the screw is rotated, and fifth means for connecting the fourth means to the crank shafts to rotate said crank shafts as the fourth means moves axially relative the screw.

24. The apparatus of claim 23 further characterized in that the second means includes clutch means mounted on the screw for applying a rotary driving force from the gear to the screw and movable relative the gear when the elongated member is moved from its first axial position to its second axial position to decrease said driving force sufficiently to terminate rotation of the screw, and means cooperating with the screw for retaining the clutch means in a position relative the gear to apply a sufficient force to rotate the screw when the elongated member is in its first position.

25. The apparatus of claim 24 further characterized in that the second means includes cooperating means in part mounted on the screw and in part mounted on the fourth means to block further rotary movement of the screw in a direction that the crank shafts are rotated to elevate the platform when the platform has been moved to bed level and thereby through the continued rotation of the gear and the clutch means move said elongated member toward its second axial position.

26. The apparatus of claim 24 further characterized in that the fifth means includes sixth means connected to one of the crank shafts to abut against the elongated member mounting means when the platform is at ground level and a bar for connecting the sixth means to the fourth means to block movement of the fourth means further in a direction that the platform is lowered, said screw moving towards its second axial position as it is rotated in a direction that the platform is lowered after the sixth means abuts against said screw mounting means.

27. Apparatus attached to the frame of a vehicle for moving a load between ground level and the level of a vehicle bed comprising a housing, a pair of parallel crank shafts rotatably mounted on the housing in spaced relationship, an elongated crank arm for each crank shaft and attached to the respective crank shaft to rotate therewith, a loading platform having a load supporting surface, means mountingly attaching the loading platform to the crank arms for movement therewith and relative thereto to retain the loading platform to have its loading surface generally horizontal as the crank arms are moved to move said platform between ground level and the level of the vehicle bed, first means connected to the crank shafts to simultaneously rotate said shafts the same angular amount to move the crank arms and thereby the loading platform between ground level and the level of the bed, and power means connected to the first means for operating said rotating means, said first means including an axially elongated screw having an axially elongated intermediate threaded portion, means for rotatably mounting said screw in said housing, a ball nut assembly mounted on said screw threaded portion for translatory movement relative thereto as the screw is rotated, and means for connecting the ball nut assembly to the crank shafts to rotate said crank shafts as the ball nut assembly is translatorily moved.

28. The apparatus of claim 27 further characterized in that the power means includes a motor having a motor shaft, and a worm gear drivenly connected to said motor shaft, and that the first means includes a driven gear rotatably mounted on said screw and clutch means for applying a driving force from the worm gear to the driven gear.

References Cited
UNITED STATES PATENTS

| | | | |
|---|---|---|---|
| 2,701,656 | 2/1955 | French | 214—75 |
| 2,787,388 | 4/1957 | Spitler | 214—75 |

ROBERT G. SHERIDAN, *Primary Examiner.*